United States Patent Office 3,296,914
Patented Jan. 10, 1967

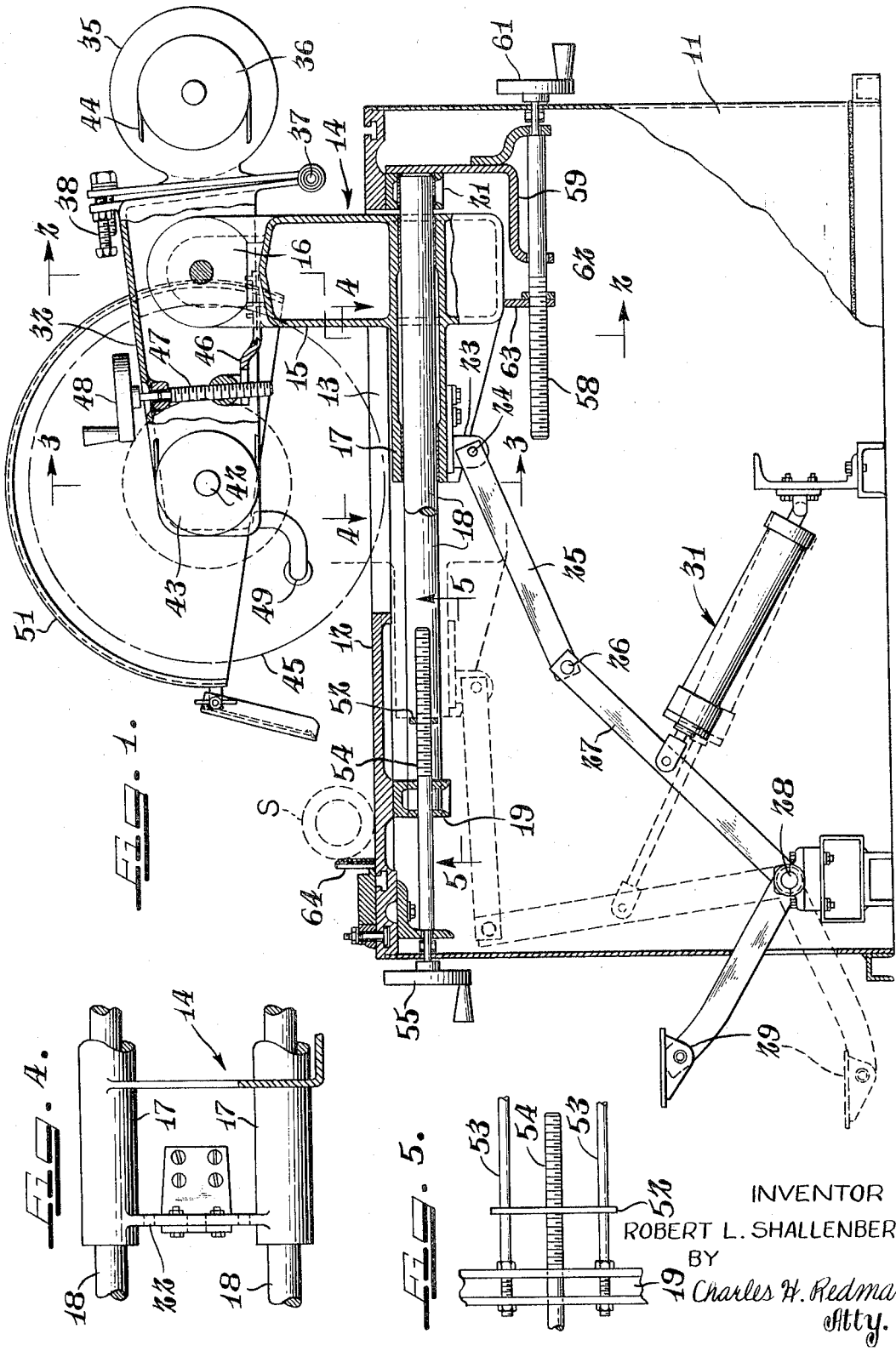

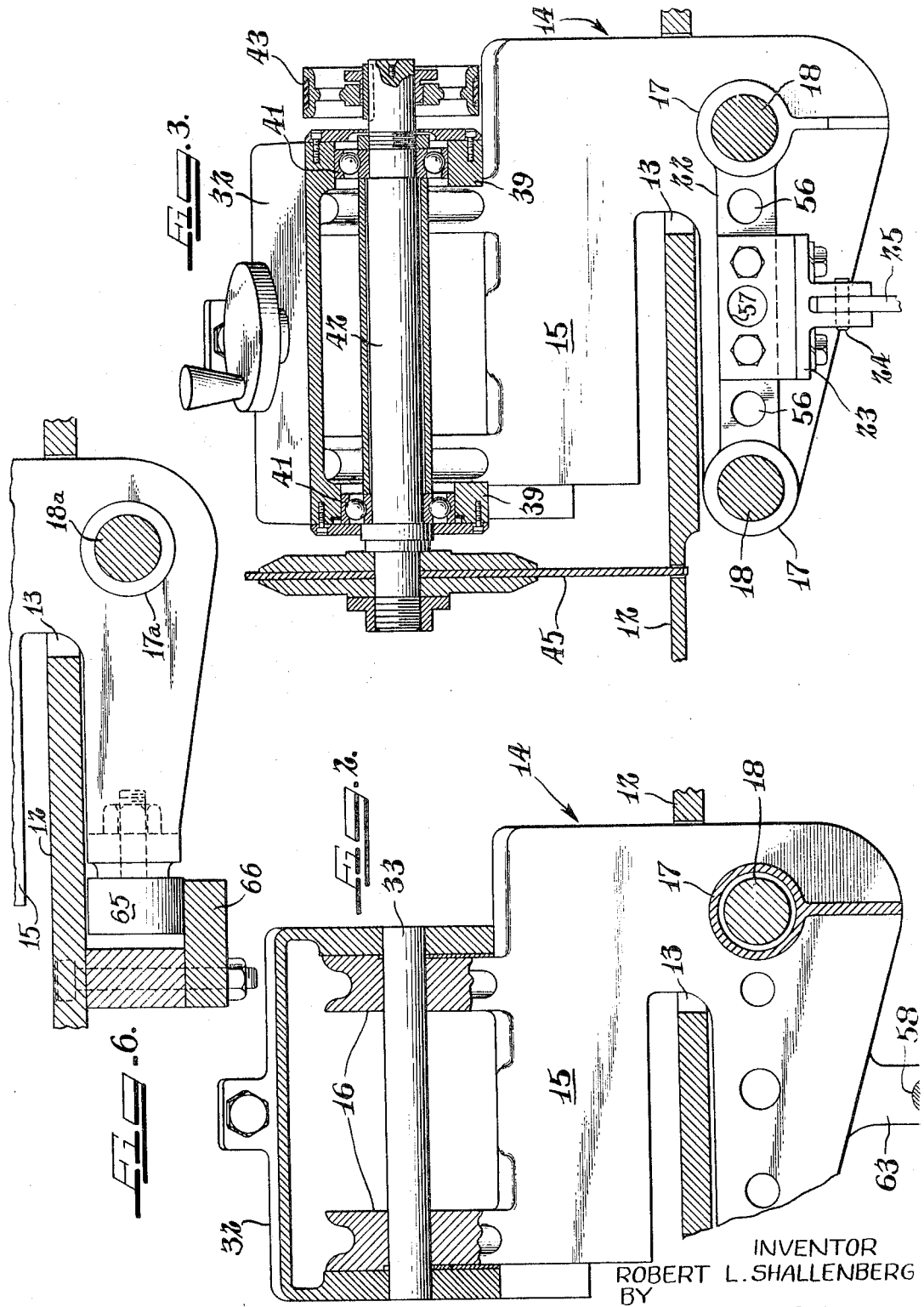

3,296,914
HIGH SPEED CUT OFF SAW
Robert L. Shallenberg, Wheaton, Ill., assignor, by mesne assignments, to K-Line Corporation, Geneva, Ill., a corporation of Illinois
Filed Jan. 29, 1965, Ser. No. 428,983
5 Claims. (Cl. 83—488)

This invention relates to improvements in saws and is particularly concerned with the novel construction and assembly of a high speed cut-off saw of the type adapted to cut heavy steel beams, tubing, rod stock and the like.

The machine embodying the features of the present invention comprises, generally a heavy base upon which is mounted a horizontally reciprocable carriage carrying the saw blade that is mounted on one end of the beam pivoted substantially midway between its ends on said carriage, and carrying the drive motor on its other end. Novel means is provided to manually reciprocate the carriage so as to carry the saw blade toward and away from the stock to be sawed and novel means is also provided to afford ready adjustment of the limit of movement of the carriage in either direction. The structure recited above is especially suitable because it affords means to permit open top loading of the machine. Further, the depth of the saw cut can be adjusted readily by novel means provided.

It is, therefor, an object of the invention to provide a cut-off machine of novel construction.

Another object is to provide novel means for mounting the saw blade on a reciprocable carriage.

Another object is to provide a novelly mounted and manipulated carriage assembly.

Another object is to provide novel means to adjust the limit of travel of the carriage in either direction.

Another object of the invention is to provide a high speed cut-off saw which is not expensive to manufacture, is very ruggedly constructed, easy to adjust, is efficient in its operation and very effective in its use.

The structure by means of which the above noted and other advantages and objects of the invention are attained will be described in the following specification, taken in conjunction with the accompanying drawings, showing preferred illustrative embodiments of the invention, in which:

FIG. 1 is a side elevational view of the saw machine, showing parts broken away to illustrate structural details;

FIG. 2 is a transverse sectional view of the beam mounting, taken substantially along line 2—2 of FIG. 1;

FIG. 3 is a transverse sectional view of the saw blade mounting, taken substantially on line 3—3 of FIG. 1;

FIG. 4 is a fragmentary plan view of the carriage bearings viewed substantially along line 4—4 of FIG. 1;

FIG. 5 is a detail view of an adjustable stop viewed along line 5—5 of FIG. 1; and, FIG. 6 is a fragmentary transverse sectional view, similar to FIG. 3, showing a modified structure.

Referring to the exemplary disclosure of the high speed cut-off saw illustrated in FIGS. 1 through 5 in the accompanying drawings, the assembly includes an upright base structure 11 having a top wall 12 slotted longitudinally at one end, as at 13, to receive mounted therein a reciprocable carriage 14.

The carriage 14 is characterized by having an upstanding body 15 that extends through the slot 13 and has at its upper end a pair of laterally spaced apart bearing journals 16. Its lower end portion, which lies beneath top wall 12, includes a pair of laterally spaced parallel tubular bosses 17, each slidably mounted on a guide rod 18. These guide rods are anchored at their ends in transverse bars 19, 21 secured to the underside of top wall 12.

The forward ends of the bosses 17 are bridged by a web 22 (FIG. 5) which carries a connector bracket 23 to which is pivotally connected, as at 24, the upper end of a link 25. Said link has a pivotal connection at 26 with a companion arm 27 secured firmly to a rock shaft 28 having a foot treadle 29 connected thereto. It should be evident that upon depression of the foot treadle 29, the arm and link are articulated so as to advance the carriage 14 from the full line position shown in FIG. 1 into the dotted line position illustrated. In lieu of the foot treadle, a piston-cylinder assembly 31 may be provided to actuate the arm-link assembly for moving the carriage.

Mounted on the upper end of carriage 14 is a saw blade drive assembly. This assembly comprises a beam 32 pivotally mounted between its ends, as by a shaft 33, to the upstanding bearing journals 16. Mounted firmly on the rearmost end of said beam is an electric motor 35 having a pulley 36 on its drive shaft. Preferably, the motor is pivotally mounted as at 37, so as to permit tensioning of a belt trained over said pulley 36 upon adjustment of an adjust screw 38. The forward end of the beam 32 is formed with laterally spaced bearing housings 39 mounting anti-friction bearings 41 in which a shaft 42 is freely rotatable. One end of shaft 42 carries firmly a pulley 43. A belt 44 operatively connects the pulleys 36, 43. The other end of shaft 42 mounts a circular saw blade 45.

In order to adjust the cutting depth of the saw blade 45, a bracket 46 is secured firmly to the top surface of carriage body 15. This bracket carries a trunnion block having a threaded aperture to receive an adjusting screw 47 carried on the beam 32. A hand wheel 48 on said screw affords means to manually rotate the screw so as to raise or lower the forward end of the beam 32 and thus adjust the cutting depth of the saw blade. If desired a grab bar 49 may be secured to the forward end of the beam 32 and a guard shield 51 arranged around the upper perimeter of the saw blade.

Reciprocable sliding movement of the carriage 14 in both directions is limited by novel stop means. Movement in a forward direction is limited by an adjustable stop bar 52 which, as best shown in FIG. 5, is guided for free sliding along rods 53 and has a threaded connection with a screw shaft 54 mounted for free rotation in bearing bar 19 on the base, and which extends to the outside thereof and carries a hand wheel 55. Rotation of said shaft 54 moves the stop bar 52 towards and away from the carriage. When the carriage reaches its predetermined forward position, the web 22 bridging the carriage bosses 17, abuts said bar. Holes 56 and 57 in said web permit it to slide freely over the projecting ends of rods 53 and shaft 54.

A like structure is provided at the rear end of the machine to limit carriage movement in that direction. As shown, this includes a screw 58 journalled in bracket 59 and having a hand wheel 61 thereon. The screw 58 is threaded through a bar 62 that is guided on rods (not shown) in a manner similar to stop bar 52. The carriage has a depending flange 63 disposed to strike said bar 62 when its limit of rearward movement is reached.

It should be evident from the foregoing that a length of stock "S" laid on the top surface of the base and against the face plate 64 of a mitre guage can be sawed easily and quickly. The present structure is characterized in the fact that it permits open top loading.

In the embodiment shown in FIG. 6, the carriage 15 is formed on its lower end portion beneath the top wall 12, and at one end, with a tubular boss 17a that is slidably mounted on a guide rod 18a. The other end of said portion mounts a roller 65, rotatable on a horizontal axis, which is arranged to travel over a guide rail 66 secured to the under side of top wall 12. In other respects, the structure is like that shown in FIGS. 1 through 5. This structure has the advantage of minimizing alignment problems present when the parallel guide rods 18 are employed.

Although I have described preferred embodiments of the invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described and shown.

What I claim and desire to secure by Letters Patent of the United States is:

1. In a machine of the character described, a base, at least one guide rod on said base, a carriage mounted on said guide rod for reciprocation on said base, means operable to reciprocate said carriage, adjustable means to limit reciprocable movement of said carriage, a beam pivotally mounted on said carriage, a circular saw blade rotatably mounted at one end on said beam, and a drive motor for said circular saw blade carried on the other end of said beam.

2. In a machine of the character described, a base, at least one guide rod on said base, a carriage, means at one end of said carriage engageable with and guided on said guide rod, a rail on said base substantially coextensive with and parallel to said guide rod, a roller on the other end of said carriage arranged to ride on said rail, a beam pivotally mounted on said carriage, a cutting tool mounted at one end of said beam, and a drive motor for said cutting tool carried on the other end of said beam.

3. In a machine of the character described, a base, a carriage reciprocable on said base, a foot lever, linkage operably connecting said foot lever with said carriage effective to reciprocate the carriage when the foot lever is actuated, adjustable stop means to limit reciprocation of said carriage, a standard on said carriage, a beam pivoted between its ends on said standard, a circular saw blade journalled in one end of said beam, a motor on the other end of said beam, a drive connection between the motor and saw blade, and means to position the beam about its axis to locate the circular saw blade for cutting to a predetermined depth.

4. The machine recited in claim 3, in which the adjustable stop means comprises plates carried by adjustable screws.

5. The machine recited in clam 3, in which the means to position the beam comprises a bracket on the standard and an adjusting screw on the beam engaged in said bracket.

References Cited by the Examiner

UNITED STATES PATENTS

| 1,366,783 | 1/1921 | Fretter | 83—488 |
| 1,885,520 | 11/1932 | Hutchinson | 143—6 |
| 2,026,363 | 12/1935 | Schiller | 83—471 |
| 2,371,401 | 3/1945 | Martin | 143—47 |
| 2,442,042 | 5/1948 | Hamilton. | |

FOREIGN PATENTS 1,135,696  12/1956  France.

ANDREW R. JUHASZ, *Primary Examiner.*

WILLIAM W. DYER, JR., L. B. TAYLOR, *Examiners.*